Nov. 10, 1931.  P. RIECKE  1,831,720
ELECTRICALLY CONTROLLED OPENING AND CLOSING
MEANS FOR VERTICAL CHAMBER OVENS
Filed Aug. 23, 1928  4 Sheets-Sheet 1

Inventor
Paul Riecke,
By John B. Grody
Attorney

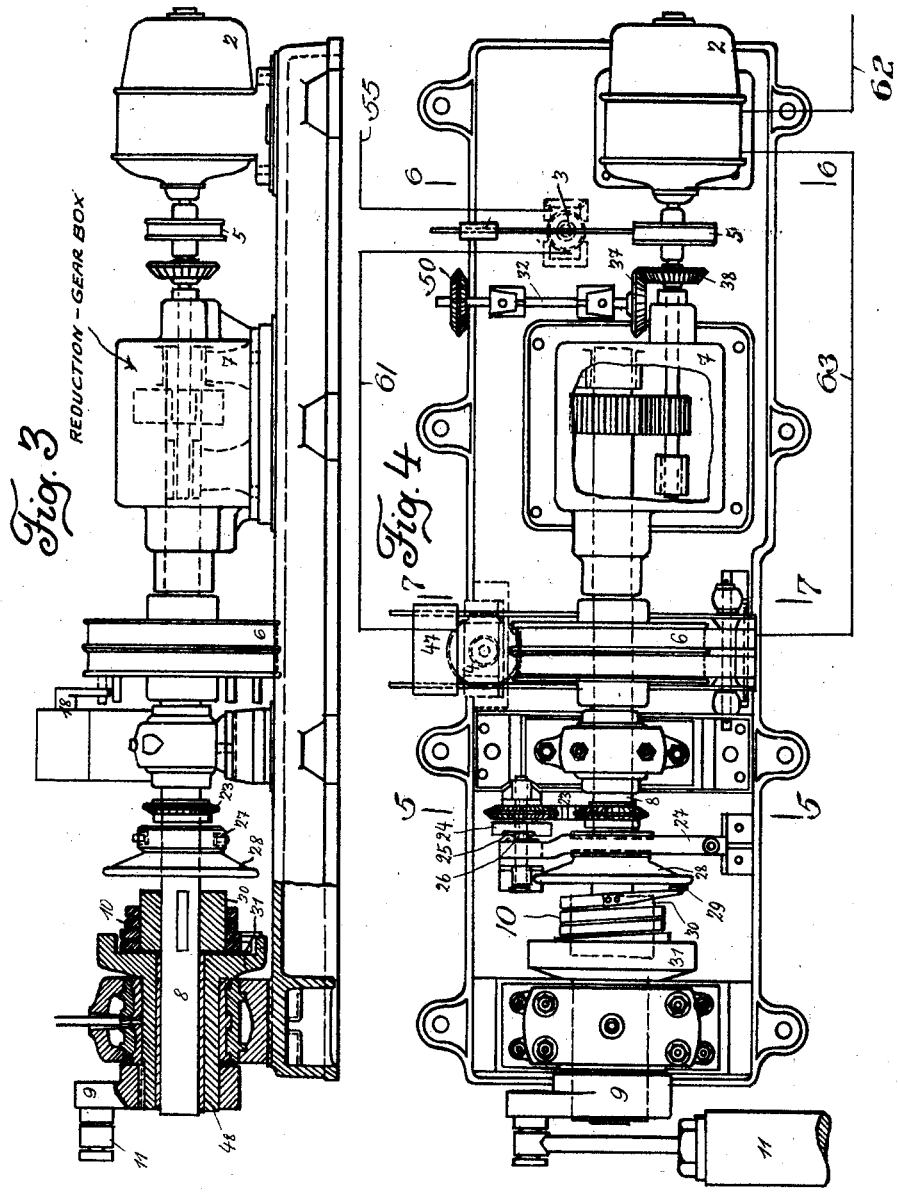

Nov. 10, 1931. P. RIECKE 1,831,720
ELECTRICALLY CONTROLLED OPENING AND CLOSING
MEANS FOR VERTICAL CHAMBER OVENS
Filed Aug. 23, 1928    4 Sheets-Sheet 3
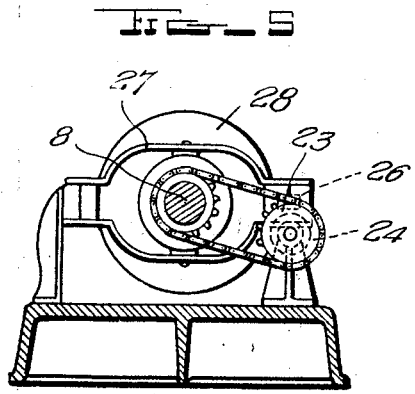
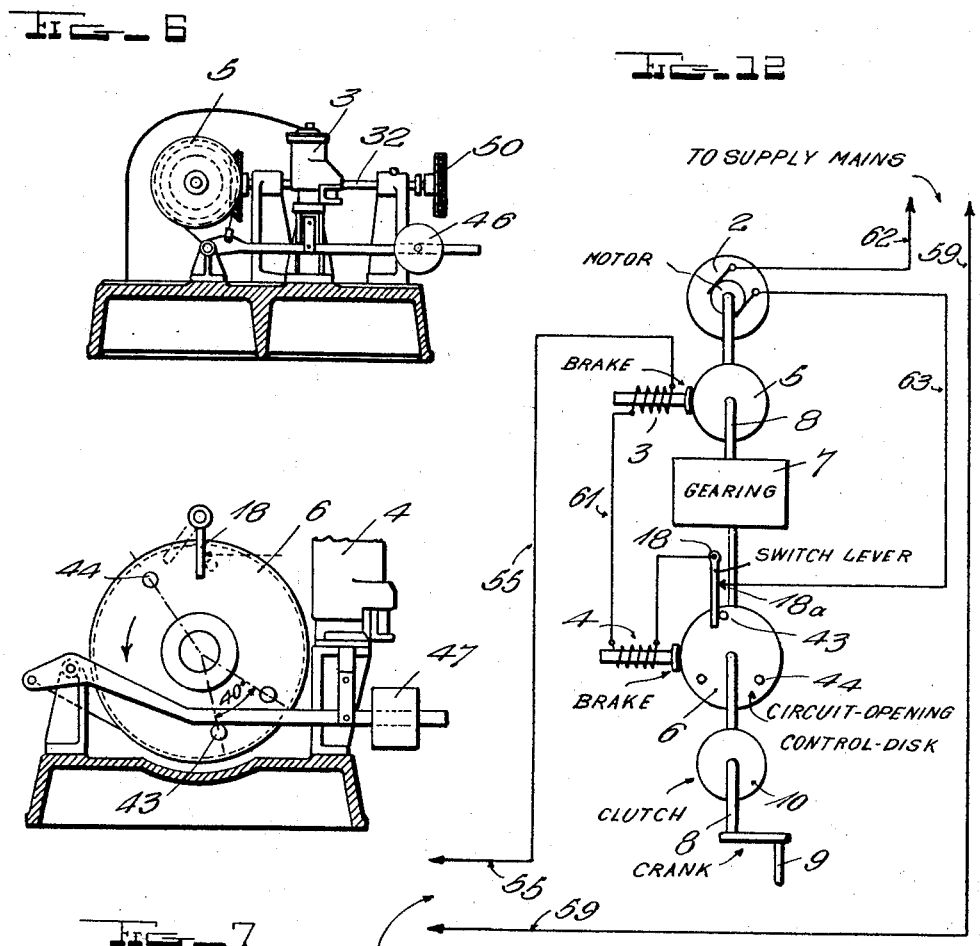
INVENTOR.
Paul Riecke,
BY
John B. Brady
ATTORNEY.

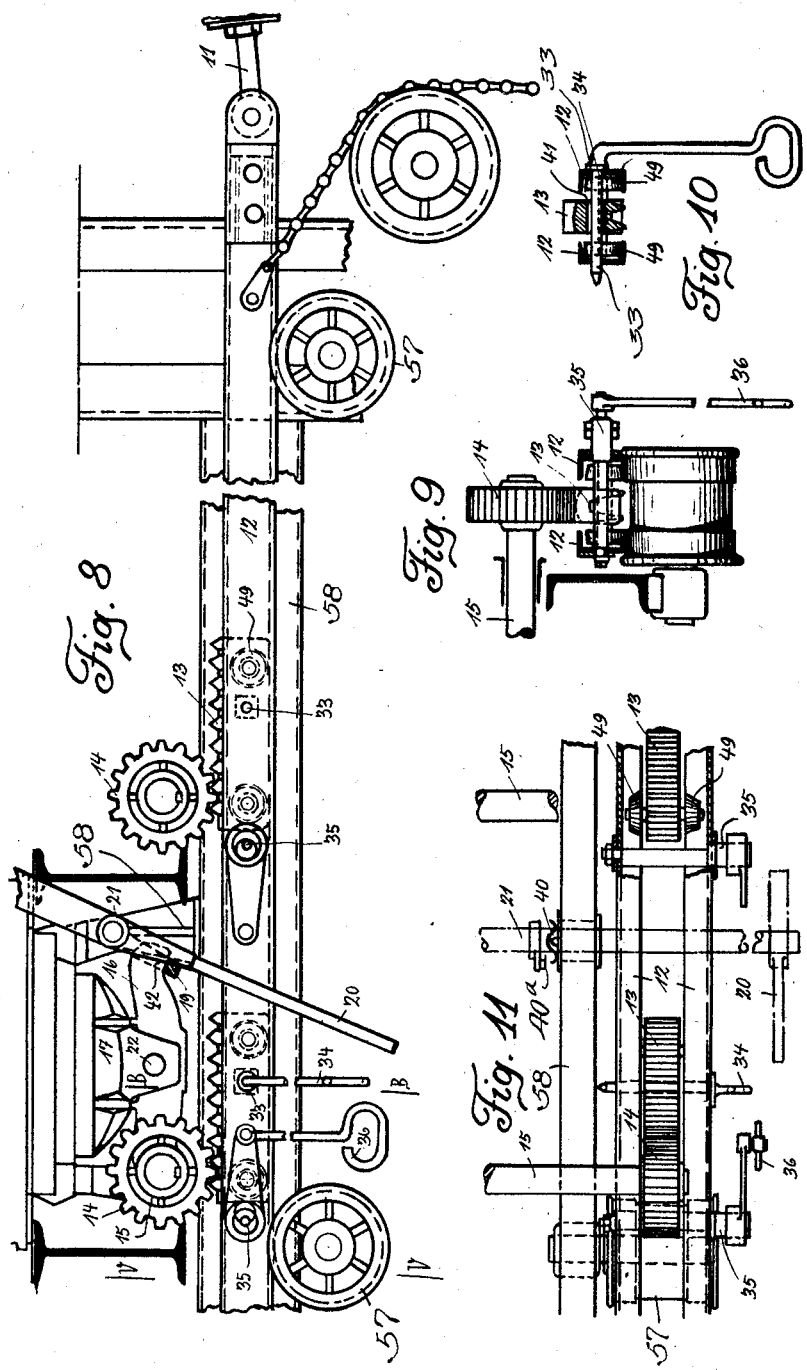

Patented Nov. 10, 1931

1,831,720

UNITED STATES PATENT OFFICE

PAUL RIECKE, OF DESSAU, GERMANY

ELECTRICALLY CONTROLLED OPENING AND CLOSING MEANS FOR VERTICAL CHAMBER OVENS

Application filed August 23, 1928, Serial No. 301,552, and in Germany June 21, 1927.

The enlargement and multiplication of the retorts of vertical-chamber ovens such as coke ovens or retorts entailed by the increasing consumption of coal, and the necessity of reducing the running costs of smaller retort and chamber units, have led to the opening and closing of the retort bottoms being effected by purely mechanical or hydraulic means.

The mechanical closing devices known at present are very troublesome to manipulate and entail difficult individual arrangements and an increased working staff. The hydraulic devices have the defect that, owing to the action of the coke dust, those parts of the hydraulic plant (delivery plungers, cylinder and the like) which have to be kept tight against a pressure of 50–100 atmospheres, are exposed to particularly heavy wear. They are also liable to the risk of freezing, and are therefore unsuitable for modern gas-producing plants of the unenclosed type.

The present invention relates to apparatus for opening and closing the bottoms of vertical chamber ovens, which is operated solely by hand or by hydraulic appliances and which offers a substantial improvement over the opening and closing means, now known in the art, both by its specific arrangement and by the manner in which its various parts co-operate, and which obviates the aforesaid inconvenience in that, by employing electric operating means, the bottom closures or doors of the retorts open freely under the action of gravity on releasing a latch mechanism, are then brought by the electric operating means into an open position beyond the position to which the doors open under gravity, and are then re-closed by the electric operating means. This effect is obtained in particular in that the transmission of the movement of the electric motor to the bottom door takes place through an actuating crank or the like which is driven only intermittently from the main shaft, this intermittent movement being initiated and stopped by automatic switches. Since the crank is always turned in one direction, no reversing switch is needed for the motor.

The arrangement according to the invention is therefore such that the apparatus can be attended to by one oven operative, who can at any time effect the opening and closing of each of the several retort bottom doors, inasmuch as, by pressing a button, he switches on the motor, then connects a shaft attached to the door in question into engagement with one of a number of racks with means adapted to be actuated by the movement of the crank, and latches or unlatches the door by turning a lever. According to the invention, the door which is opened is positively moved beyond the position to which it opens under gravity, and is held in such a wide open position that the block of coke can drop down unhindered. The door is prevented from swinging back by the following-up movement of the crank. In this way the inconvenience caused in the existing free-fall doors or bottom closures, by the probability that the descending block of coke will lodge on the door or the insulating hood, is removed. The circumstance that, owing to incrustations of tar, the door is likely to stick on the packing surface of the baseplate, and has to be removed, by means of crowbars, in a manner that frequently endangers the life of the operative, is also obviated in the apparatus according to the present invention because the crank positively ensures the opening of the door. Moreover, in apparatus to which the invention is applied, the striking of the door, when opening under gravity, against parts of the oven, and the resulting damage or shock, cannot occur, because the movement of the door is restricted by the stroke of the crank.

Preferably, the transmission of the movement of the crank to the rack which is to be connected up in each case, that is, at each door which is to be opened or closed, is effected through guide rails, mounted on rollers in front of the oven, by means of a connecting rod which is resilient or provided with springs, thereby enabling the two dead points of the crank to be overcome.

An apparatus embodying the invention will now be described by way of example with reference to the accompanying drawings, in which:—

Fig. 3 is a side elevation of the crank mechanism;

Fig. 4 is a plan of Fig. 3;

Fig. 5 is a section along the line 5—5 of Fig. 4;

Fig. 6 is a section along the line 6—6 of Fig. 4;

Fig. 7 is a section along the line 7—7 of Fig. 4;

Fig. 8 shows the operating rails, with a door or bottom closure in the closed position;

Fig. 9 is an end view partly in section of Fig. 8;

Fig. 10 is a section through the operating rails and rack (Fig. 8);

Fig. 11 is a plan view of the operating rails and co-operating parts (Fig. 8);

Fig. 12 is a diagrammatic view of the assembly illustrated in Figure 4, showing circuit connections.

Figure 1:
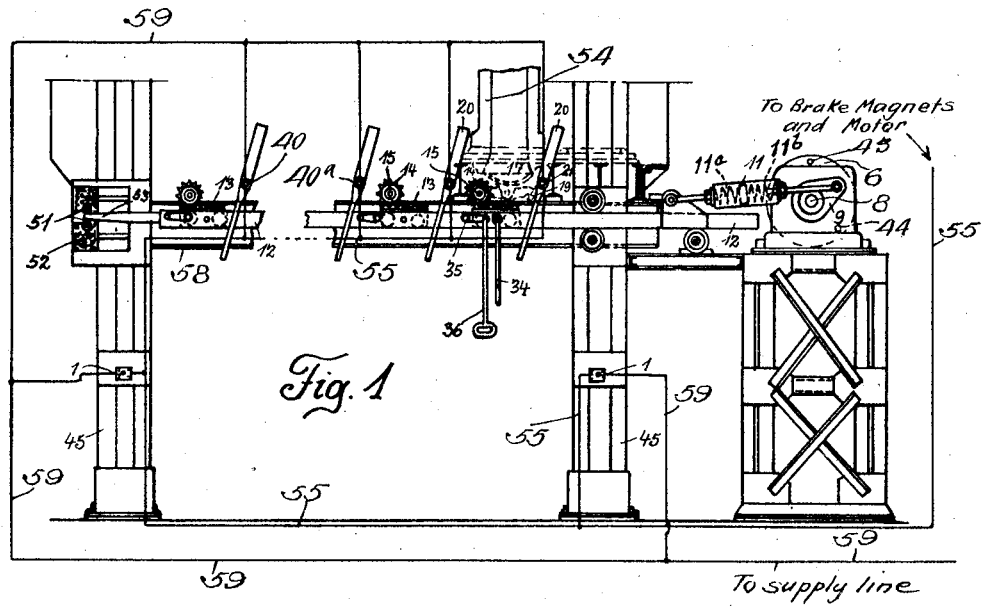
Fig. 1 is a front elevation of part of a vertical oven having the said apparatus applied thereto.
Figure 2:
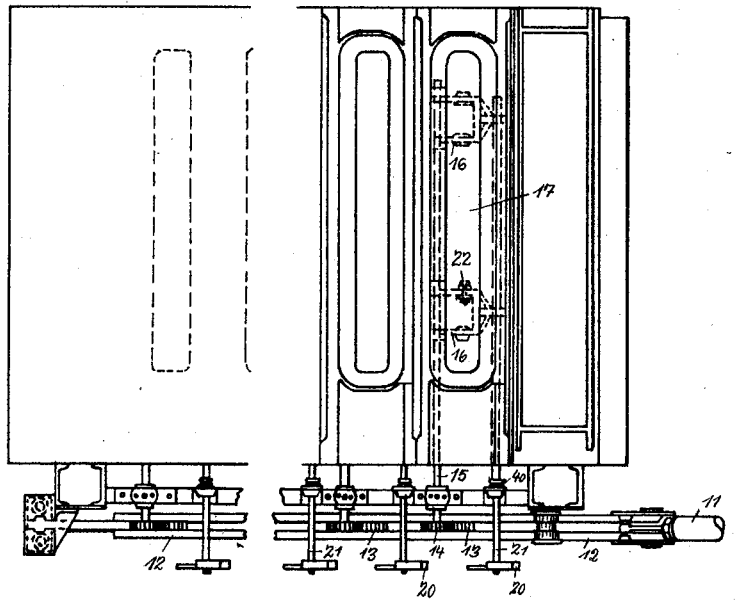
Fig. 2 is a plan of Fig. 1, without the crank mechanism.

In front of the row of ovens (one of which, 54 is shown in Fig. 1) is disposed the closing mechanism, which is mounted on supports 45. This closing mechanism consists of two adjacently disposed and connected channel rails 12, which run on rollers 57 and are moved to and fro by the turning of a crank 9 driven from an electric motor 2 through a connecting rod 11. In order that sufficient resilience may be imparted to the connecting rod 11, I provide resilient members 11a and 11b connected to the adjacent ends of the two portions of the connecting rod and disposed within a confining casing as shown. Each of the ovens 54 is provided with a rack 13 disposed between the rails 12 and displaceable in relation thereto, each such rack gearing with a pinion 14 which turns a shaft 15 whereon is mounted the bottom closure or door 17 for the corresponding oven. This door is secured by a latch 19, mounted on a shaft 21 and swung by the lever 20. The shaft 21 (Figs. 1 and 11) carries a contact 40a coacting with a contact 40 mounted on a frame 58 of the oven.

In the transmitting mechanism between the electric motor 2 and the crank 9 driven from the shaft 8, two electrically controlled brake magnets 3 and 4 are interposed (Figs. 3, 4, 6 and 7), one of them, 3, acting on the weighted brake mechanism 46 of the motor 2 (Fig. 6), while the other, 4, influences the weighted brake mechanism 47 of a brake pulley 6 mounted on the shaft 8. This pulley 6 also serves as an electric switch drum (Figs. 1, 3 and 7) in such a way that said drum, when turned in the direction of the arrow in Fig. 7 moves a switch lever 18 away from its contact 18a, by means of strikers 43 and 44 and thus interrupts the current.

360° of rotation of the crank 9 are utilized for actuating a bottom closure or door 17 in three stages. About 160° are utilized for opening the door, a further 160° for closing the door, and the remaining 40° for carrying the crank 9 over the dead point and into position ready for opening the door the next time. The turning movement of the crank through the first 160° for opening the door is effected electrically upon actuation of the lever 20 by means of the contacts 40, 40a, while the movement through the second 160° for closing the door, and also the remaining movement through 40°, are effected by operating a push-button switch 1.

Each of the support 45 is provided with a push-button switch 1. The switches 1, and also the contacts 40, are connected, on the one hand, with the magnets 3 and 4 by wiring 55, and on the other hand, the switches 1 and the lever contacts 40a are connected together by the current lead-in wire 59. The current is led from the magnets 3 and 4, by wire 60, to the terminal switch lever 18 actuated by the drum 6, and thence through the contact 18a and the motor 2. Magnets 3 and 4 may be connected together by wire 61 as shown in Fig. 12. Motor 2 is connected to one supply main by wire 62 and to switch contact 18a by wire 63. Lead-in wire 59 is connected to the other supply main.

The shaft 8 is rotatable by the motor 2 through the intermediary of a speed reducing gear 7 (Figs. 3 and 4). The one end of the shaft 8 is adapted to be connected to the crank 9 by a spring clutch 10, for which purpose the crank 9 is mounted on a hollow shaft 48 co-acting with the clutch 10.

To the crank 9 is attached the connecting rod 11, which serves to impart reciprocating motion to the rails 12 and is either resilient itself or is provided with springs 11a and 11b, as shown.

In place of the rack and pinion mechanism 13 and 14, the transformation of the reciprocating motion of the rails 12 into the rotary motion of the shaft 15 can be effected by chain or other suitable gearing. The shaft 15 is connected to the cover in known manner by means of forks 16 and eccentric screws 22.

With the hydraulic opening and closing mechanism hitherto employed, one of the guide rails actuated by the hydraulic cylinders and carrying firmly attached racks, had to turn all the pinions of an oven by the movement of the rail, so that the transmission of this motion to the cover shaft was effected in a cumbrous and time-wasting manner, and the friction set up by the simultaneous turning of all the pinions increased the consumption of power to a not inconsiderable extent.

By the arrangement of loose racks according to the present invention, these drawbacks are obviated, because although each pinion 14 gears permanently with the corresponding rack 13, the racks at first all rest loosely, by means of rollers 49, on the rails 12. Hence, if the rails 12 are moved while the doors 17 are closed, the racks 13, retained by the pinions 14, remain at rest.

In order to establish the connection between the rails 12 and the racks 13, the rails 12 (see Fig. 8) are provided with holes 33, and corresponding holes 41 (Figs. 10 and 11) are provided in each rack, said holes being adapted for the insertion of a connecting pin 34.

The shaft 21 for any cover 17 can be turned by the lever 20 to bring the stop block or latch 19 under the noses 42 of the forks 16.

During the opening of a door the contact 40 on the shaft 21 keeps the electric circuit closed until the crank 9 is brought, beyond its dead point, into the ready position for the movement required for reclosing the door 17. In this position of the crank, the circuit is broken, through the terminal switch 18 on the drum 6, by means of the striker 43. The brakes 5 and 6 then come into action directly the current is switched off; and the clutch 10 of the crank 9 is also thrown out in this ready position. The mode of operating the opening and closing apparatus according to the invention is as follows:—

If a door 17 is to be opened, the attendant first inserts the pin 34 through the holes 33 of the rails 12 in register with the hole 41 of the appropriate rack 13 and then moves the corresponding lever 20 so that the stop block 19 releases the noses 42 of the fork and the door 17 can drop down, the pinion 14 turning under the weight of the door and shifting the rack together with the rails 12. At this time the current is switched on by the contact 40 so that the shaft 9 is turned by the motor 2, a control disc 24 being turned with it by a chain wheel gear 23. At first the clutch 10 is disengaged but after the disc has turned a short distance a roller 26 issues from a recess 25 in the disc and then rolls on the plane surface of the disc, thereby causing a lever 27 to press the clutch disc 28 against the spring lever 29 on the end of the helical spring 10. This causes the spring 10 to grip a sleeve 30 connected to the shaft and thus transmit its rotation to the facing driving disc 31 of the hollow shaft 48 and thus to the crank 9, which now moves the rails 12.

Hence a short turning movement of the shaft 8 is sufficient to set the crank mechanism in operation, so that this can be effected in a very short time. The rotation of the pinion 14 by the further advance of the rails 12 causes the door 17, which has dropped down into its lowest position of suspension, to be turned beyond that position until the crank has attained its maximum throw.

At this moment the terminal switch 18 is disconnected by the striker 43 arranged on the drum 6, so that the motor becomes dead and the two brakes 5 and 6 brake the shaft 8. In running down, the crank 9 stops at approximately its dead point, though it may also stop a little sooner or a little later, since the dead point position is easily passed by the resilient action of the connecting rod 11 during the subsequent operation of closing the door.

The closing of the cover 17 is effected in the following manner;

The oven attendant switches on the current by pressing the corresponding button 1, so that the brakes 5 and 6 are released and the shaft 8 starts to turn, accompanied by the crank 9, in the same direction as before. This causes the rails 12 to draw back the rack 13, thereby closing the door 17. As soon as the door is closed the electric motor 2 is put out of operation and the brakes 5 and 6 are applied automatically by the striker 44 opening the terminal switch 18. The door 17 is kept in closed position by means of the stop block 19, on the lever 20 being turned back. The pin 34 is now taken out and can then be inserted in the corresponding place, in front of another retort, which is to be emptied, in order to connect the rack 13 with the rails 12, whereupon the opening of the door proceeds in the manner described. In order to get the holes 33 and 41 accurately in register for inserting the pin 34, and to impart a relative movement to the rack 13 and rails 12 so as to loosen the pin 34 when the same is to be taken out, and because the latch 19 (apart from the shaft 15) has to carry the greater part of the weight of the contents of the retort which would make the turning of the lever 20 by the operator very difficult, there is arranged in front of each rack an eccentric pin 35 (Figs. 8 and 9), which can be turned by a handle 36 and acts at the same time as a spacing pin. Before the cover is opened, the eccentric 35 is brought by means of the hand grip 36 into the position shown at the left of Fig. 8, i. e. set to the right, whereby the rack is moved so far to the right that the "dead" motion existing between rack and pinion 14 is overcome. As a result, the cover is pressed so firmly on the mouth of the retort, that the stop latch 19 is relieved from the weight of the contents of the retort. In this position of the rack, the pin 34 can be conveniently introduced.

While the band brake 5 brakes the running of the motor, the brake 6 stops the crank 9, so that the closed door will not open again of its own accord, and the attendant has sufficient time to work the lever 20. The manner in which the operation of the brakes 5 and 6 is effected is such that, when the current is switched off, the magnets 3 and 4 release the weights 46, 47 which drop, and in so doing apply the brakes.

To ensure greater reliability in working, a brake (Fig. 1) is provided on the free end of the reciprocating rails 12. This brake may consist of brake rollers 51, which are pressed together by springs 52 and grip the tapered end 53 of the guide rails when the door falls open, and thereby brake the fall of the door as well; or the roller brake may be replaced by a liquid brake for the rails.

In order to enable work to be continued in the event of a failure of current, the motor shaft is connected by cone pinion gearing (37, 38) with a shaft 32 which can be turned by means of gear 50.

It is also possible, with the present invention, to keep one or more of the doors permanently open, even during the opening and closing of other doors in the same battery, as is necessary, for example, when the chambers have to be cleared of graphite.

I claim:

1. Opening and closing means for vertical-chamber ovens comprising the combination of lower bottom closures for the ovens and an electric motor, with means whereby each bottom closure is pivotally supported so as to open by gravity, locking means whereby each bottom closure can be kept closed, a common operating rail extending in front of said bottom closures, a pinion rotatable with each bottom closure, a rack in gear with each pinion and mounted loosely on said rail, a crank adapted to be turned by said electric motor, a resilient pitman connecting said crank and rail, means whereby each rack can be fixed individually to said rail, a control circuit for controlling said electric motor, automatic switch means operable by unlocking said locking means so as to close a circuit of said motor and thereby cause said crank and pitman to produce a movement of said rail in one direction, a contact breaker for interrupting said control circuit of said electric motor at the end of said movement, switch means independently operable for closing said control circuit of said motor and effecting movement of said rail in the opposite direction and means for opening said contact breaker actuable by the movement of said rail in said opposite direction sufficiently to close each bottom closure.

2. Opening and closing means for vertical-chamber ovens comprising the combination of lower bottom closures for the ovens and an electric motor, with means whereby each bottom closure is pivotally supported so as to open by gravity, locking means whereby each bottom closure can be kept closed, a common operating rail extending in front of said bottom closure, a pinion rotatable with each bottom closure, a rack in gear with each pinion and mounted loosely on said rail, a crank adapted to be turned by said electric motor, a resilient pitman connecting said crank and rail, means whereby each rack can be fixed individually to said rail, a control circuit for controlling said electric motor, automatic switch means operable by unlocking said locking means so as to close said control circuit of said motor and cause said crank and pitman to produce a movement of said rail in one direction, a contact breaker for interrupting said control circuit of said motor at the end of said movement, switch means independently operable for closing said control circuit of said motor and effecting movement of said rail in the opposite direction, a contact breaker for interrupting said control circuit and actuable by the movement of said rail far enough in the opposite direction to close each bottom closure operated, and an adjustment device for each rack whereby said rack can be accurately adjusted along said rail so as to effect ready fixing of said rail and rack together.

3. Opening and closing means for vertical-chamber ovens comprising the combination of lower bottom closures for the ovens and an electric motor, with means whereby each bottom closure is supported so as to open by gravity, locking means whereby each bottom closure can be kept closed, a common operating element extending in front of said bottom closures, a crank, clutch means connecting said crank and electric motor, a resilient pitman connecting said crank and element, means whereby said bottom closures can be operatively coupled separately with said operating element, automatic switch means whereby said element is operable by said motor so as to open each bottom closure coupled to said element beyond the position to which said bottom closure opens by gravity, switch means independently operable for closing a circuit of said motor and moving said element by said motor so as to close each coupled bottom closure, contact braking means adapted to put said electric motor out of circuit when a bottom closure it fully opened and fully closed, means whereby said clutch means is automatically engaged and disengaged respectively when said motor is put in and out of circuit before and after the combined opening and closing operation, and braking means adapted to brake said electric motor when put out of circuit and simultaneously prevent movement of each bottom closure operated thereby.

4. In combination, a vertical retort having a discharge opening at the bottom thereof, a door pivotally supported on said retort adjacent said opening and adapted to close said opening, a shaft mounted for actuating said door, a pinion carried by said shaft, a rack engaging said pinion, a rail adjacent said rack, means for locking said rack to said rail, an electric motor, a crank attached to said rail for reciprocating said rail, a reduction gearing connecting said crank with the shaft of said motor, electrical control means operable by the movement of said door for connecting electric power to said motor at positions of said door intermediate the fully closed position and fully opened position, electrical control means operable by the turning of said crank for disconnecting electric power from said motor at positions of said crank corresponding to the fully opened or fully closed positions of said door, and independent control means for starting said motor, said electrical control means being adjusted for causing said motor to move said door to a position beyond that naturally assumed by gravity to clear the discharge path of said retort.

5. In combination, a vertical retort having a discharge opening at the bottom thereof, a door pivotally supported on said retort adjacent said opening and adapted to close said opening, a shaft mounted for actuating said door, a pinion carried by said shaft, a rack engaging said pinion, a rail adjacent said rack, means for locking said rack to said rail, an electric motor, a resilient crank attached to said rail for reciprocating said rail, a reduction gearing connecting said crank with the shaft of said motor, electrical control means operable by the movement of said door for connecting electric power to said motor at positions of said door intermediate the fully closed position and fully opened position, electrical control means operable by the turning of said crank for disconnecting electric power from said motor at positions of said crank corresponding to the fully opened or fully closed positions of said door, and independent control means for starting said motor, said electrical control means being adjusted for causing said motor to move said door to a position beyond that naturally assumed by gravity to clear the discharge path of said retort.

6. In combination, a vertical retort having a discharge opening at the bottom thereof, a door pivotally supported on said retort adjacent said opening and adapted to close said opening, a shaft mounted for actuating said door, a pinion carried by said shaft, a rack engaging said pinion, a rail adjacent said rack, means for locking said rack to said rail when desired, an electric motor, a crank attached to said rail for reciprocating said rail, a reduction gearing connecting said crank with the shaft of said motor, electrical control means operable by the movement of said door for connecting electric power to said motor at positions of said door intermediate the fully closed position and fully opened position, means for electro-magnetically braking said shaft when no electric current passes through said motor, and independent control means for starting said motor, said electrical control means being adjusted for causing said motor to move said door to a position beyond that naturally assumed by gravity to clear the discharge path of said retort.

7. In combination, a vertical retort having a discharge opening at the bottom thereof, a door pivotally supported on said retort adjacent said opening and adapted to close said opening, a latch for retaining said door in closed position, a shaft mounted for actuating said door, a pinion carried by said shaft, a rack engaging said pinion, a rail adjacent said rack, means for locking said rack to said rail, an electric motor, a crank attached to said rail for reciprocating said rail, a reduction gearing connecting said crank with the shaft of said motor, electrical control means operable by the turning of said crank for connecting electric power to said motor when said door is at positions intermediate the fully closed position and the fully opened position, independent control means for starting said motor, and a switch actuatable by the opening of said latch of said door and connected for supplying power to said motor when said door is unlatched, said electrical control means being adjusted for causing said motor to move said door to a position beyond that naturally assumed by gravity to clear the discharge path of said retort.

8. In combination, a vertical retort having a discharge opening at the bottom thereof, a door pivotally supported on said retort adjacent said opening and adapted to close said opening, a shaft mounted for actuating said door, a pinion carried by said shaft, a rack engaging said pinion, a rail adjacent said rack, means for locking said rack to said rail when desired, an electric motor, means for adjusting the position of said rack relative to said rail for facilitating the locking of said rack to said rail, a crank attached to said rail for reciprocating said rail, a reduction gearing connecting said crank with the shaft of said motor, electrical control means adapted to be operable by the movement of said door for connecting electric power to said motor at positions of said door intermediate the fully closed position and fully opened position, and independent control means for starting said motor, said electrical control means being adjusted for causing said motor to move said door to a position beyond that naturally assumed by gravity to clear the discharge path of said retort.

9. In combination, a vertical retort having a discharge opening at the bottom thereof, a door pivotally supported on said retort adjacent said opening and adapted to close said opening, a shaft mounted for actuating said door, a pinion carried by said shaft, a rack engaging said pinion, a rail adjacent said rack, means for locking said rack to said rail, an electric motor, a crank attached to said rail for reciprocating said rail, a reduction gearing connecting said crank with the shaft of said motor, electrical control means operable by the movement of said door for connecting electric power to said motor at positions of said door intermediate the fully closed position and fully opened position, and independent control means for starting said motor, said electrical control means being adjusted for causing said motor to move said door to a position beyond that naturally assumed by gravity to clear the discharge path of said retort, and means operable by the turning of said crank to disconnect said motor as positions of said crank corresponding to fully opened or fully closed positions of said door.

10. In a system for discharging vertical retorts, a plurality of retorts each having a discharge opening at the bottom thereof, a plurality of doors, one for each of said retorts pivotally supported on said retorts adjacent said openings and adapted to close said openings respectively, shafts mounted for actuating each of said doors respectively, pinions carried by said shafts respectively, racks engaging each of said pinions, a rail adjacent said racks, means for selectively locking each of said racks to said rail, an electric motor, a crank attached to said rail for reciprocating said rail, a reduction gearing connecting said crank with the shaft of said motor, electrical control means operable by the movement of said door for connecting electrical power to said motor at positions of said door intermediate the fully closed position and fully opened position, and independent control means for starting said motor, said electrical control means being adjusted for causing said motor to move said doors to a position beyond that naturally assumed by gravity to clear the discharged path of said retorts.

11. In a system for discharging vertical retorts, a plurality of retorts each having a discharge opening at the bottom thereof, a plurality of doors, one for each of said retorts pivotally supported on said retorts adjacent said openings and adapted to close said openings respectively, shafts mounted for actuating each of said doors respectively, pinions carried by said shafts respectively, racks engaging each of said pinions, a rail adjacent said racks, means for selectively locking each of said racks to said rail, an electric motor, a resilient crank attached to said rail for reciprocating said rail, a reduction gearing connecting said crank with the shaft of said motor, electrical control means operable by the movement of a door for connecting electrical power to said motor at positions of a door intermediate the fully closed position and the fully opened position, and independent control means for starting said motor, said electrical control means being adjusted for causing said motor to move said doors to a position beyond that naturally assumed by gravity to clear the discharge path of said retorts.

12. In a system for discharging vertical retorts, a plurality of retorts each having a discharge opening at the bottom thereof, a plurality of doors, one for each of said retorts pivotally supported on said retorts adjacent said openings and adapted to close said openings respectively, shafts mounted for actuating each of said doors respectively, pinions carried by each of said shafts, racks engaging each of said pinions, a rail adjacent said racks, means for selectively locking each of said racks to said rail, an electric motor, a shaft for said motor, a crank attached to said rail for reciprocating said rail, a reduction gearing connecting said crank with the shaft of said motor, an electromagnetic brake connected to brake said shaft of said motor when no electric power is delivered to said motor, electrical control means operable by the turning of a door for connecting electrical power to said motor at positions of one of said doors intermediate the fully closed position and the fully opened position, and independent control means for starting said motor, said electrical control means being adjusted for causing said motor to move said doors to a position beyond that naturally assumed by gravity to clear the discharge path of said retorts.

13. In a system for discharging vertical retorts, a plurality of retorts each having a discharge opening at the bottom thereof, a plurality of doors, one for each of said retorts pivotally supported on said retorts adjacent said openings and adapted to close said openings respectively, latches for retaining said doors in closed position, shafts mounted for actuating each of said doors, pinions carried by said shafts respectively, racks engaging each of said pinions, a rail adjacent said racks, means for selectively locking each of said racks to said rail, an electric motor, a crank attached to said rail for reciprocating said rail, a reduction gearing connecting said crank with the shaft of said motor, electrical control means operable by the turning of said crank for connecting electrical power to said motor at positions of said crank corresponding to positions of a door intermediate the fully closed position and the fully opened position, independent control means for starting said motor, circuit closing means actuable by the opening by the latch of one of said doors and connected for supplying power to said motor when said doors are unlatched, said electrical control means being adjusted for causing said motor to move said doors to a position beyond that naturally assumed by gravity to clear the discharge path of said retorts.

14. In a system for discharging vertical retorts, a plurality of retorts each having a discharge opening at the bottom thereof, a plurality of doors, one for each of said retorts pivotally supported on said retorts adjacent said openings and adapted to close said openings respectively, shafts mounted for actuating said doors respectively, pinions carried by said shafts respectively, racks engaging each of said pinions, a rail adjacent said racks, means for selectively locking each of said racks to said rail, means for selectively adjusting the position of each of said racks respectively relative to said rail for facilitating the locking of said racks to said rail, an electric motor, a crank attached to said rail for reciprocating said rail, a reduction gearing connecting said crank with the shaft of said motor, electrical control means operable by the movement of said door for connecting electrical power to said motor at positions of said door intermediate the fully closed position and the fully opened position, and independent control means for starting said motor, said electrical control means being adjusted for causing said motor to move said doors to a position beyond that naturally assumed by gravity to clear the discharge path of said retorts.

In testimony whereof I affix my signature.

PAUL RIECKE.